Feb. 18, 1936.   E. N. DINGLEY, JR   2,030,857
ELECTRICAL CIRCUIT ANALYZER
Filed March 20, 1934   2 Sheets-Sheet 1
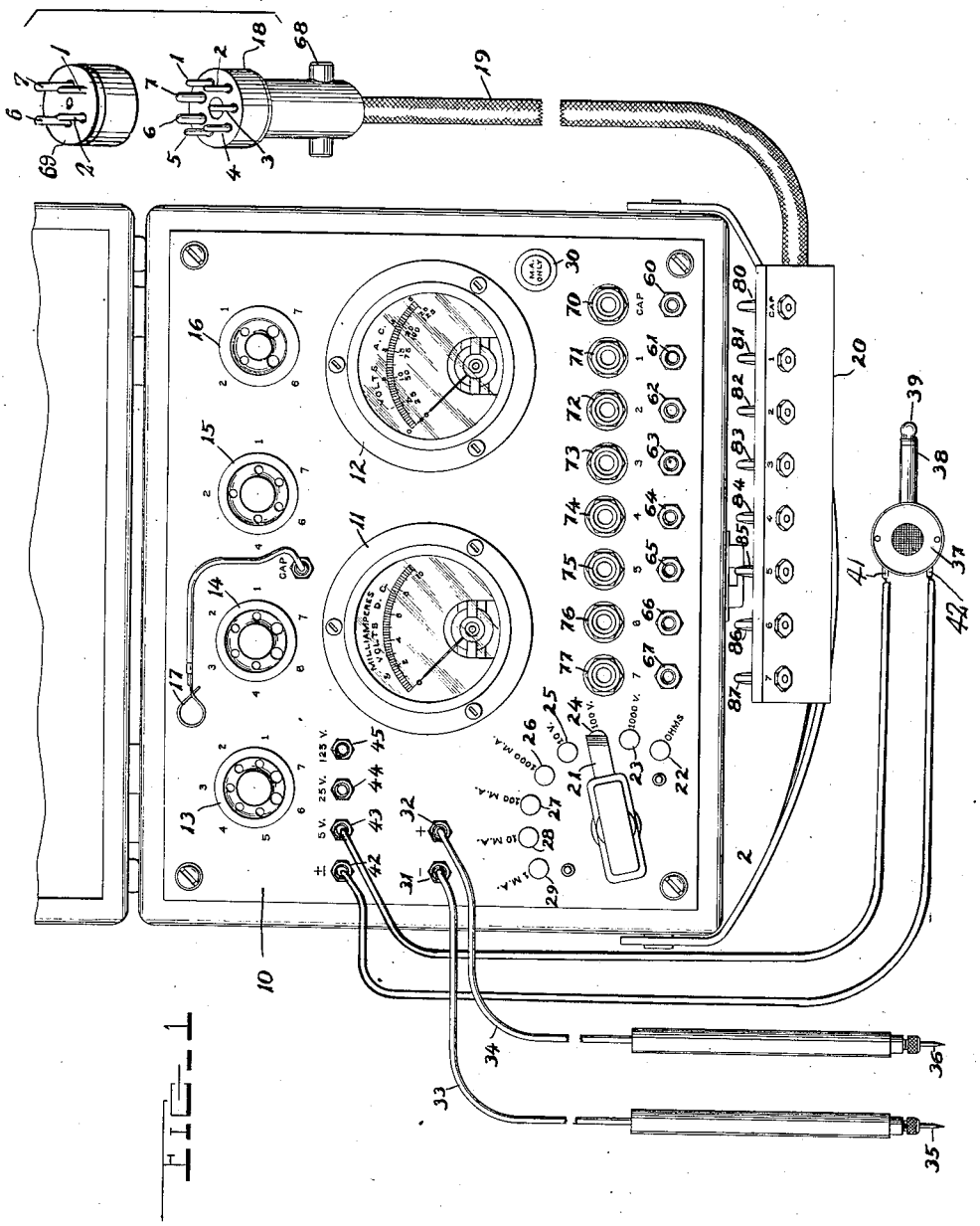
INVENTOR
Edward N. Dingley, Jr.
BY
Harold Dodd
ATTORNEY

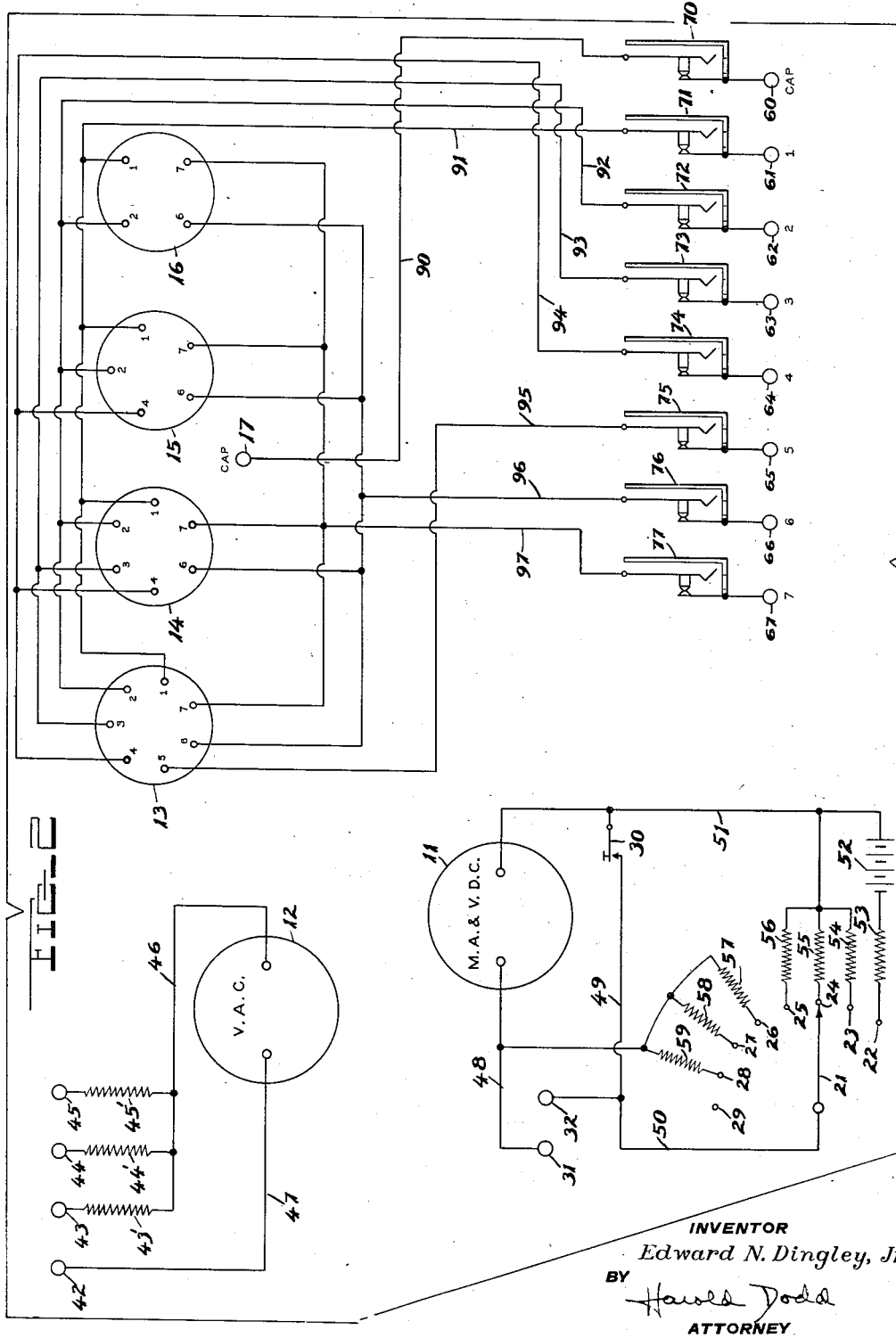

Patented Feb. 18, 1936

2,030,857

UNITED STATES PATENT OFFICE 2,030,857

ELECTRICAL CIRCUIT ANALYZER

Edward N. Dingley, Jr., Washington, D. C.

Application March 20, 1934, Serial No. 716,511

4 Claims. (Cl. 250—20)

(Granted under the act of March 3, 1883, as amended April 30, 1928; 370 O. G. 757)

This invention relates to an apparatus for testing circuits employing thermionic tubes such as radio receivers, public address amplifiers, etc. The apparatus may be used for testing various types of electrical equipment but it is particularly adapted to be used for the testing of apparatus used in electron tube amplifying circuits.

Modern radio and amplifying equipment has become so complex that it is difficult to provide a test instrument that is capable of being used to test circuits using all kinds of tubes. Many types of analyzers are now commercially available which operate on the principle of replacing the vacuum tube, in a socket of a radio receiver or amplifier, with a plug that is connected by means of a multi-conductor cable to a socket mounted on the panel of a circuit analyzer. The tube that was removed from the receiver is then placed in the socket of the analyzer. By means of a multi-pole master switch, a multi-range current meter is switched in series with certain ones of the various conductors of the connecting cable, or a multi-range voltmeter is switched across certain pairs of the conductors of the conducting cable.

This invention is of the above type, wherein a tube of the set to be tested is replaced by a test plug and the tube is placed in a socket of the test instrument. The present invention, however, differs in that the multi-pole master switch system is not used but, instead, a system of jacks is used in which a normally closed circuit jack is connected in each of the leads to the vacuum tube socket in which it may be desired to test the current flowing in the conductor connected to any tube element, or in which it might be desired to measure the voltage between any two of the tube elements or the resistance in any part of a circuit.

The principal object of this invention is to provide a simplified circuit arrangement together with suitable instruments by means of which the potentials between any two of the socket elements or the current flowing to or from any one of the tube elements may be determined rapidly and accurately without the necessity of complicated master switches.

Another object of the present invention is to provide a testing instrument that may be readily adapted to make any type of test on any type of equipment employing thermionic tubes having varying numbers of terminal elements.

A further object of the invention is to provide an instrument that is capable of testing thermionic equipment under actual operating conditions.

A still further object of the invention is to provide a device, the parts of which that are subjected to wear may be easily inspected and replaced.

Other objects and advantages of the invention will be apparent from the following description and from the accompanying drawings in which similar characters of reference indicate similar parts throughout the several views.

Referring to the drawings:

Fig. 1 is a plan view of the present testing device showing the various measuring instruments, sockets, jacks, plugs, etc.;

Fig. 2 is a schematic wiring diagram of the testing device shown in Fig. 1.

Referring now to Fig. 1, 10 indicates a test instrument panel, while 11 and 12 are electrical indicating instruments. 13, 14, 15 and 16 are thermionic tube sockets, adapted to receive 7-prong, 6-prong, 5-prong and 4-prong tubes, respectively. 17 is a cap lead for connecting to the cap terminal an electron tube that may be inserted in any one of the sockets. 18 is a test plug having the prongs 1, 2, 3, 4, 5, 6, 7, and cap terminal 68 corresponding to the prongs and cap electrode of a tube having seven socket prongs and a cap electrode. 19 is a multi-conductor cable connecting the respective terminals of the test plug 18 to the multi-contact plug 20. Mounted on panel 10 are a plurality of pin jacks 60 to 67, inclusive, into which the pins 80 to 87, inclusive, of plug 20 are adapted to be inserted. Above the pin jacks are a series of normally closed circuit telephone jacks 70 to 77, inclusive. A switch arm is shown at 21 that is adapted to be brought into contact with contacts 22 to 29, inclusive. A push button switch 30 is also mounted on the instrument panel. Pin jack terminals 31 and 32 are connected by means of flexible conductors 33 and 34 to test prods 35 and 36, respectively. Double contact telephone plug 37 having a sleeve contact 38 and a tip contact 39, may be connected at its terminals 41 and 40 to the flexible leads 33 and 34 in place of the test prods, and leads 33 and 34 may be connected to pin jacks 42 and 43, 44 or 45.

The connections of the various parts of the apparatus shown in Fig. 1 may be better understood by reference to Fig. 2 in which like reference characters indicate the same parts. In Fig. 2 it can be seen that the pin jacks 60 to 67, inclusive, are connected to the sleeve contacts of the normally closed circuit jacks 70 to 77, inclusive, and the tip contacts of these jacks 70 to 77, inclusive, are connected by means of conductors 90 to 97, inclusive, to the cap lead 17 and to the terminals of 4-, 5-, 6-, and 7-prong tube sockets 16, 15, 14, and 13, respectively.

The electrical indicating instrument 11 has one terminal thereof connected to pin jack 31 by means of a conductor 48 while the other terminal of said instrument may be connected to pin jack 32 by means of the conductor 49 and the push button switch 30 in the closed position, or by way of conductor 51 and an appropriate one of the resistance multipliers 54 to 56, switch arm 21 and conductor 50, or by way of conductor 51 to battery 52, resistance 53, switch arm 21 and conductor 50.

It will be noted that switch arm 21 may be set to any one of eight positions. When it is in contact with switch contact 22, the battery 52 and resistance 53 are connected in circuit and the instrument may be used as an ohmmeter for determining a resistance connected between pin jacks 31 and 32. With the switch arm contacting with contact 23, 24, or 25, varying values of resistance 54, 55 and 56 may be included in circuit as voltmeter multipliers, in which case the instrument 11 will give an indication on its proper scale of the voltage impressed across pin jacks 31 and 32. With switch arm 21 contacting with contacts 26, 27, 28 or 29, and with the push button switch 30 closed, the instrument 11 will indicate on its proper scale, the amount of current flowing through the circuit between pin jacks 31 and 32.

The electrical instrument 12 (A. C. voltmeter) is connected by means of conductor 47 to pin jack 42 and by means of conductor 46 to pin jacks 43, 44 and 45 through multipliers 43', 44' and 45', respectively.

In operation, the system is used as follows: The test plug 18 is inserted in an electron tube socket of the apparatus to be tested while the tube that was removed from said socket is inserted in the socket 13 of the test instrument, if it is a tube having a 7-prong base. If the tube has only six prongs, five prongs or four prongs, it is inserted into socket 14, 15 or 16, respectively, and plug 18 is changed by an appropriate adapter indicated at 69. If the tube employed in the circuit to be tested has a cap electrode, the connector 17 is connected to the cap thereof after the tube has been inserted in the appropriate socket and the cap lead of the apparatus to be tested is connected to the terminal 68 of the test plug.

With the test plug 18 fitted with the proper adapter and inserted in a socket of a radio or other apparatus to be tested and with the tube inserted in the proper socket of the analyzer, connection is made between the radio or other apparatus and the tube in the analyzer in exactly the same manner as if the tube were actually in the socket of the apparatus being tested, with the very important exception that the voltage delivered to each pin of the tube is now easily accessible at the exposed sleeves of the closed circuit jacks. Assuming first that it is desired to determine the amount of current flowing in any one of the leads to any one of the tube elements, it is only necessary to connect leads 33 and 34 to the terminals 40 and 41 of the telephone plug 37 and insert this plug into the proper jack 70 to 77, and press closed the push button switch 30 to connect the instrument 11 in shunt with one of the ammeter shunts 57 to 59.

Assuming next that it is desired to determine the voltage between any two of the tube elements, all that is necessary is to set the switch arm 21 to include the appropriate voltage multiplier in the circuit and contact the test prods 35 and 36 to the sleeves of the jacks 70 to 77, inclusive, between which it is desired to read the potential difference. Voltages between different parts of a circuit may also be determined by using the test prods 35 and 36 to connect the voltmeter directly to the points across which it is desired to find the voltage. In case it is desired to test the resistance between any two points in the circuit under test, it is necessary to set the switch arm 21 to the contact 22 and then connect test prods 35 and 36 across the resistance to be tested either by way of the jacks 70 to 77, inclusive, or directly to the points in the set.

In order to measure alternating current voltages, the voltmeter 12 is used and by means of the pin jacks 42 to 45, inclusive, any one of the multipliers 43', 44' and 45', each of which is of a different range, can be brought into circuit. The testing of the A. C. voltage is substantially the same as of the D. C. voltage except that the flexible conductors 33 and 34 are associated with the pin jack 42 and one of pin jacks 43, 44 or 45, instead of pin jacks 31 and 32.

The greatest advantage of this invention is the ease with which measurements may be made. Every operator of such an analyzer is familiar with the base connections of standard radio tubes or can obtain the necessary data which once known is easily retained in the mind. If, for example, a type '22 tube is under test and the plate voltage is desired, it is only necessary to place the test prods of a voltmeter across the jacks 72 and 76 or 72 and 77, depending on whether the measurement is to be made to the positive or negative side of the filament. To find the filament voltage and which side of the filament is positive, it is only necessary to place the test prods across the jacks 76 and 77. The plate current is obtained by placing the telephone plug, connected to the current meter, in jack 71; the filament current by placing the plug in jack 76 or 77. The grid bias is obtained by measuring between jacks 70 and 76 or, if cathode bias is used, by measuring between jacks 76 or 77 and the chassis of the receiver. The screen grid voltage is obtained by measuring between jacks 72 and 76, etc. The resistance of any part of the receiver circuit which is connected to the tube socket may be measured by turning off the receiver, placing the switch arm 21 to the contact 22, and then connecting the test prods 35 and 36 across any pair of jacks or directly to the points in the set.

To simplify analysis of equipment, the panel of the analyzer has engraved thereon the designations "cap" and numerals "1" to "7" inclusive below the jacks 70 to 77 inclusive. Adjacent the terminals of the tube sockets, corresponding designations have been engraved on the panel so that when it is desired to make measurements at jacks 70 to 77 inclusive, the jacks corresponding to the respective socket terminals may be readily determined by corresponding designations.

The simplification of this type of analysis is self-evident. The operator knows exactly what he is measuring. In the case of master-switch analyzers the operator is never quite sure what he is measuring because of the complication of the instrument.

From the above it can be seen that applicant has devised a test instrument in which the current to any element of a thermionic tube may be measured and in which the voltage across or the resistance between any points may be measured without the necessity of complicated multi-position, multi-contact switches.

The invention described herein may be manufactured and used by or for the Government of the United States of America for governmental purposes without the payment of any royalties thereon.

I claim:

1. In a testing device for apparatus employing electron tubes, the combination of a test plug having contact prongs corresponding to the terminals of an electron tube, a plurality of electron tube sockets, conductors extending between corresponding terminals of said plurality of tube sockets and the prongs of said test plug, and normally closed circuit jacks included in circuit between said contact prongs and said corresponding socket terminals whereby a current indicating instrument may be connected in circuit between any one of said prongs and the corresponding socket terminal by inserting a double contact plug connected to said current indicating instrument into an appropriate one of said jacks or a voltage indicating instrument may be connected between any two of said jacks by a pair of single contact plugs connected to said instrument.

2. In a testing device for apparatus employing electron tubes, the combination of a test plug having contacts corresponding to the terminals of an electron tube employed in apparatus to be tested, an electron tube socket adapted to receive a tube employed in apparatus to be tested, conductors extending between corresponding terminals of said socket and said plug, and normally closed circuit jacks included in said conductors whereby a double contact plug connected to an instrument may be inserted in any one of said jacks to open the normally closed circuit therethrough and connect said instrument in circuit or a pair of single contact plugs connected to an instrument may be inserted in any selected pair of said jacks to connect said instrument between said jacks without opening the jack circuits.

3. In a testing device for electron tube circuits, the combination of a test plug having contact prongs corresponding to the terminals of an electron tube, with a flexible conductor cable having conductors leading from said contact prongs to a multi-contact plug, a test instrument panel, a plurality of pin jacks mounted on said panel and adapted to receive said multi-contact plug, an electron tube socket and a plurality of normally closed circuit jacks mounted on said panel, conductors connecting the tip contacts of said normally closed circuit jacks to the terminals of said electron tube socket, conductors connecting the sleeve contacts of said normally closed circuit jacks to the corresponding pin jacks mounted on said panel, a current indicating instrument having its terminals connected to the terminals of a double contact plug, and a voltage indicating instrument having its terminals connected to test prods, whereby the current indicating instrument may be connected in circuit between any desired one of said test plug prongs and the corresponding terminal of the electron tube socket by plugging said double contact plug into an appropriate jack and the voltage indicating instrument may be connected across any desired two terminals of said electron tube socket by contacting the test prods with the desired ones of said jacks.

4. A testing device for testing electron tube circuits, comprising a test plug having prongs corresponding to the terminals of an electron tube, an insulating test instrument panel, a cable connecting said prongs to respective ones of a plurality of contacts mounted on said panel, an electron tube socket mounted on said panel, a plurality of normally closed circuit jacks mounted on said panel and connected in circuit between respective ones of the terminals of said socket and the contacts comprising said plurality of contacts mounted on said panel, an electrical indicating instrument mounted on said panel and provided with flexible leads, a test prod connected to each of said leads, whereby said instrument may be connected between any two of the leads to said socket by bringing said test prods into contact with the sleeve contacts of appropriate ones of said jacks, a current indicating instrument mounted on said panel, a test plug and flexible leads connecting the terminals of said current indicating instrument to the terminals of said plug whereby said current indicating instrument may be connected in any desired one of the leads to said socket by inserting said plug in the proper one of said jacks.

EDWARD N. DINGLEY, Jr.